April 6, 1954  J. LEZZENI, SR  2,674,083
FRUIT PICKER
Filed Oct. 10, 1952
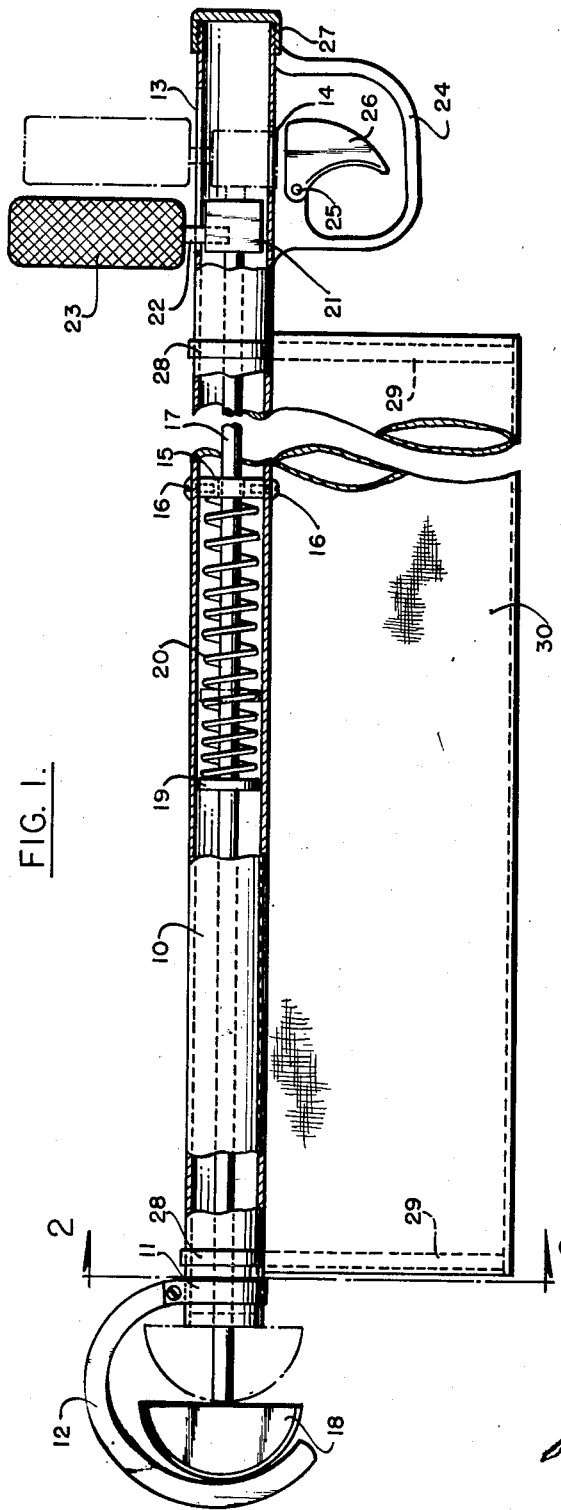
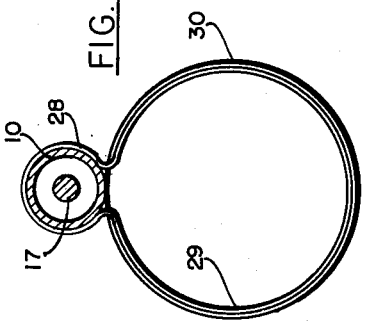
INVENTOR
John Lezzeni Sr.

UNITED STATES PATENT OFFICE 2,674,083

FRUIT PICKER

John Lezzeni, Sr., Fairfax, Calif.

Application October 10, 1952, Serial No. 314,142

1 Claim. (Cl. 56—338)

The present invention relates to a fruit picker and it consists in the combinations, constructions and arrangements of parts herein described and claimed.

Generally there is provided a fruit picking device which consists of an elongated hollow cylindrical tube the upper end of which there is affixed a fruit engaging hook and within which there is mounted a reciprocally extending rod to the forward end of which rod there is affixed a blade which is adapted to coact with the hook to sever the stems of fruit. Means is provided for retracting rod and its blade against the action of a spring and a trigger is provided for releasing the same so that the blade may be violently projected against the hook. There is also provided as a part of the fruit picking device a chute preferably formed of canvas or the like for guiding the severed fruit down to the hands of the operator. The device is such that it permits fruit pickers to remove the fruit from trees without bruising the same and without the necessity for using ladders to secure access to such fruit.

It is accordingly an object of the invention to provide a device of the character set forth which is simple in construction, inexpensive to manufacture and yet effective and efficient in use.

Another object of the invention is to provide a novel fruit picker having novel means for severing the stems of fruit while the operator remains upon the ground.

Another object of the invention is to provide, in a device of the character set forth, a novel chute forming a part of the invention.

Other and further objects of the invention will become apparent from a reading of the following specification taken in conjunction with the drawings, in which:

Figure 1 is an exploded side elevational view, partly broken away, of an embodiment of the invention, and Figure 2 is a sectional view taken along line 2—2 of Figure 1.

Referring more particularly to the drawing, there is shown therein a fruit picker consisting of an elongated hollow tube 10 to the forward end of which is secured by means of a clamp 11 a fruit-engaging hook 12. The tube 10 is provided in its upper side and adjacent the rear end thereof with a longitudinally extending slot 13 and a relatively smalled longitudinally extending slot 14 on the lower side thereof.

A bulkhead 15 is secured by screws 16 or the like within the tube 10 and has slidably extending therethrough an elongated rod 17 which rod extends through the forward end of the tube and has affixed thereto a blade 18. A collar 19 is affixed to the rod 17 between the bulkhead 15 and the forward end of the tube and has interposed between it and the bulkhead a compression spring 20 which surrounds the rod 17.

To the rearward end of the rod 17 there is affixed a block 21 from which projects upwardly a stem 22 which has, in turn, a vertically extending knurled handle 23 affixed to its upper end. A trigger guard 24 is affixed to the underside of the tube 10 in such manner as to encompass the opening 14 and has pivotally mounted, as indicated at 25, a trigger 26 whose upper face is adapted to bear against the block 21 when the trigger is moved in a counterclockwise direction as viewed in Figure 1. The rearward end of the tube 10 is provided with a removable cap 27.

Secured to the lower side of the tube 10 as by clamps 28 is a pair of integrally formed circular frame members 29 upon which frame members is mounted an elongated tubular canvas chute 30.

In operation, it will be apparent that when it is desired a set the device, it is only necessary to move the handle 23 rearwardly so that the stem 22 will travel rearwardly in the slot 13 until the block 21 registers with the opening 14 whereupon the handle 23 may be moved downwardly so as to engage the block 21 in the opening 14. The device is now ready for use and the operator may then place the hook 12 around the stem of the fruit to be picked and thereupon pull the trigger 26 thus releasing the block 21 and allowing the compression spring 20 to move the rod 17 violently forwardly and, of course, force the blade 18 through the stem of the fruit and against the inner side of the hook 12. The fruit thus severed will fall into the upper end of the chute 30 and then travel by gravity down to a point where it may be removed by the operator. When fruit is already in the chute, the operator may squeeze the chute 30 above the fruit already in the chute in such manner as to cushion the fall of the additional fruit passing through such chute.

While but one form of the invention has been shown and described herein, it will be readily apparent to those skilled in the art that many minor modifications may be made without departing from the spirit of the invention or the scope of the appended claim.

What is claimed is:

A fruit picking device comprising an elongated hollow tube, a clamp secured to the forward end of said tube, a fruit engaging hook of arcuate shape extending forwardly from said clamp and over the forward end of the tube, said tube having an elongated slot extending longitudinally of the tube at the rear end thereof and a relatively smaller longitudinally extending slot on the lower side thereof below the first mentioned slot, a block slidable in the rear end of said tube, a handle secured to the block and extending through the first mentioned elongated slot and accessible to the operator, an elongated rod connected to the block and extending forwardly through the forward end of the tube, spring means connected between the tube and the rod for normally urging the rod toward a cutting or extended position, said rod having a cutting blade on its forward end, said rod being retractible with the cutting blade against the action of the spring means to a retracted position, said block being depressible when the rod is in the retracted position into said smaller longitudinally extending slot whereby said rod will be retained against forward movement, a trigger pivoted upon said tube and engageable with the lower end of the block projecting through said smaller slot, whereby said block can be elevated into the tube, and the rod and the cutting blade released for cutting action.

References Cited in the file of this patent

UNITED STATES PATENTS

| Number | Name | Date |
|---|---|---|
| 460,903 | Woodward | Oct. 6, 1891 |
| 720,706 | Lamb | Feb. 17, 1903 |
| 727,263 | Barrett | May 5, 1903 |
| 1,047,880 | Bauer | Dec. 17, 1912 |
| 1,280,645 | Biernat | Oct. 8, 1918 |
| 1,347,651 | Nauth | July 27, 1920 |
| 2,008,362 | Littlehale | July 16, 1935 |